(12) United States Patent
Miller et al.

(10) Patent No.: US 11,839,995 B2
(45) Date of Patent: Dec. 12, 2023

(54) HONEYCOMB BODIES WITH HONEYCOMB STRUCTURE STRENGTHENING FEATURES AND EXTRUSION DIES THEREFOR

(71) Applicant: CORNING INCORPORATED, Corning, NY (US)

(72) Inventors: Kenneth Richard Miller, Addison, NY (US); Seth Thomas Nickerson, Corning, NY (US); Danhong Zhong, Elmira, NY (US)

(73) Assignee: Corning Incorporated, Corning, NY (US)

( * ) Notice: Subject to any disclaimer, the term of this patent is extended or adjusted under 35 U.S.C. 154(b) by 311 days.

(21) Appl. No.: 17/059,808

(22) PCT Filed: May 30, 2019

(86) PCT No.: PCT/US2019/034551
§ 371 (c)(1),
(2) Date: Nov. 30, 2020

(87) PCT Pub. No.: WO2019/232148
PCT Pub. Date: Dec. 5, 2019

(65) Prior Publication Data
US 2021/0206022 A1    Jul. 8, 2021

Related U.S. Application Data
(60) Provisional application No. 62/678,768, filed on May 31, 2018.

(51) Int. Cl.
*B28B 3/26* (2006.01)
*B01D 53/88* (2006.01)
(Continued)

(52) U.S. Cl.
CPC .......... *B28B 3/269* (2013.01); *B01D 46/2462* (2013.01); *B01D 46/2474* (2013.01);
(Continued)

(58) Field of Classification Search
None
See application file for complete search history.

(56) References Cited

U.S. PATENT DOCUMENTS 3,885,977 A    5/1975    Lachman et al.
4,233,351 A   11/1980    Okumura et al.
(Continued)

FOREIGN PATENT DOCUMENTS

CN    101517206 A    8/2009
CN    107921350 A    4/2018
(Continued)

OTHER PUBLICATIONS

Chinese Patent Application No. 201980036639.6, Office Action dated Jan. 13, 2022, 33 pages of English Translation, Chinese Patent Office.
(Continued)

*Primary Examiner* — Elizabeth Collister
(74) *Attorney, Agent, or Firm* — Joseph M. Homa

(57) ABSTRACT

A honeycomb body having a honeycomb structure and a peripheral skin, the honeycomb structure having walls defining a plurality of cells including peripheral cells disposed directly adjacent to the peripheral skin. One or more of the peripheral cells is at least partially defined by a first wall surface, a second wall surface, and a skin surface portion extending between the first wall surface and the second wall surface. A continuously-varying radius extends from a first tangent to the first wall surface along the skin surface portion and to a second tangent to the second wall surface. Other
(Continued)

honeycomb bodies, structures, and extrusion dies for forming honeycomb structures are disclosed.

14 Claims, 9 Drawing Sheets

(51) Int. Cl.
  *B01J 35/04* (2006.01)
  *B01J 37/00* (2006.01)
  *C04B 38/00* (2006.01)
  *B01D 46/24* (2006.01)
(52) U.S. Cl.
  CPC ..... *B01D 46/2482* (2021.08); *B01D 46/2486* (2021.08); *B01D 53/885* (2013.01); *B01J 35/04* (2013.01); *B01J 37/0009* (2013.01); *C04B 38/0009* (2013.01); *B01D 2255/90* (2013.01)

(56) References Cited

U.S. PATENT DOCUMENTS

| | | | |
|---|---|---|---|
| 4,298,328 | A | 11/1981 | Frost |
| 4,349,329 | A | 9/1982 | Naito et al. |
| 4,455,336 | A | 6/1984 | Ogawa et al. |
| 4,835,044 | A | 5/1989 | Hattori et al. |
| 5,332,703 | A | 7/1994 | Hickman |
| 5,952,079 | A | 9/1999 | Andou et al. |
| 6,221,308 | B1 | 4/2001 | Peng |
| 6,259,078 | B1 | 7/2001 | Araya |
| 6,391,813 | B1 | 5/2002 | Merkel |
| 6,541,407 | B2 | 4/2003 | Beall et al. |
| 6,656,564 | B2 | 12/2003 | Ichikawa et al. |
| 6,803,087 | B2 | 10/2004 | Brew et al. |
| 6,827,754 | B2 | 12/2004 | Suwabe et al. |
| 7,017,278 | B2 | 3/2006 | Kato |
| 7,112,050 | B2 | 9/2006 | Bernas et al. |
| 7,596,885 | B2 | 10/2009 | Adrian et al. |
| 7,597,948 | B2 | 10/2009 | Miller |
| 8,974,724 | B2 | 3/2015 | Day et al. |
| 9,005,517 | B2 | 4/2015 | Bronfenbrenner et al. |
| 9,038,284 | B2 | 5/2015 | Feldman et al. |
| 9,335,093 | B2 | 5/2016 | Feldman et al. |
| 9,446,560 | B2 | 9/2016 | Bronfenbrenner et al. |
| 9,452,578 | B2 | 9/2016 | Bronfenbrenner et al. |
| 2002/0192426 | A1 | 12/2002 | Ichikawa et al. |
| 2004/0206044 | A1 | 10/2004 | Kondo et al. |
| 2005/0186289 | A1 | 8/2005 | Munn et al. |
| 2005/0274097 | A1 | 12/2005 | Beall et al. |
| 2007/0144127 | A1* | 6/2007 | Bardon ............ B01D 46/2462 55/523 |
| 2007/0175178 | A1 | 8/2007 | Miller |
| 2008/0072573 | A1 | 3/2008 | Carranza et al. |
| 2010/0062213 | A1 | 3/2010 | Kondo |

FOREIGN PATENT DOCUMENTS

| | | |
|---|---|---|
| CN | 108568209 A | 9/2018 |
| EP | 1698397 A1 | 9/2006 |
| JP | 2013-198884 A | 10/2013 |
| JP | 5791391 B2 | 10/2015 |
| WO | 98/05602 A1 | 2/1998 |
| WO | 2007/078946 A2 | 7/2007 |
| WO | 2008/066765 A1 | 6/2008 |
| WO | 2014/046912 A1 | 3/2014 |

OTHER PUBLICATIONS

International Search Report and Written Opinion of the International Searching Authority; PCT/US19/034551; dated Sep. 26, 2019; 11 Pages; European Patent Office.

* cited by examiner

HONEYCOMB BODIES WITH HONEYCOMB STRUCTURE STRENGTHENING FEATURES AND EXTRUSION DIES THEREFOR

This is a national stage application under 35 U.S.C. § 371 of International Application No. PCT/US2019/034551, filed May 30, 2019 which claims the benefit of priority under 35 U.S.C. § 119 of U.S. Provisional Application Ser. No. 62/678,768 filed on May 31, 2018, the contents of which are incorporated herein by reference in their entireties.

FIELD

Embodiments of the disclosure relate to honeycomb bodies comprising honeycomb structures, and more particularly to extruded honeycomb bodies comprising honeycomb structures having high isostatic (ISO) strength.

BACKGROUND

Ceramic honeycomb structures with relatively thin wall thickness can be utilized in exhaust after-treatment systems. As the walls become thinner, problems of low ISO strength may be encountered.

SUMMARY

Embodiments of the present disclosure comprise honeycomb bodies comprising honeycomb structures, such as ceramic honeycomb bodies comprising honeycomb structures that provide improved ISO strength.

Embodiments of the present disclosure include methods of manufacturing a honeycomb body comprising a honeycomb structure comprising peripheral cell configurations proximate to a peripheral skin of the honeycomb structure that improve the ISO strength of the honeycomb structure.

Embodiments of the present disclosure also include extrusion dies configured to manufacture honeycomb bodies comprising honeycomb structures comprising peripheral cell configurations proximate to a peripheral skin of the honeycomb structure with improved ISO strength.

Another embodiment of the disclosure includes a honeycomb body comprising a honeycomb structure and an outermost peripheral layer, or peripheral skin. The honeycomb structure comprises walls defining a plurality of cells comprising peripheral cells disposed directly adjacent to the peripheral skin, one or more of the peripheral cells being at least partially defined by a first wall surface, a second wall surface, and a skin surface portion extending between the first wall surface and the second wall surface, wherein the skin surface portion has a continuously-varying radius extending from a first tangent with the first wall surface to a second tangent with the second wall surface.

Another embodiment of the disclosure includes a honeycomb body comprising a honeycomb structure and an outermost peripheral layer, or a peripheral skin. The honeycomb structure comprises walls defining a plurality of cells comprising peripheral cells disposed directly adjacent to the peripheral skin, one or more of the peripheral cells being at least partially defined by a first wall surface, a second wall surface, and a skin surface portion extending between the first wall surface and the second wall surface, the skin surface portion having a continuously-varying radius extending between a first point on the skin surface portion and to a second point on the skin surface portion.

Another embodiment of the disclosure includes a honeycomb body comprising a honeycomb structure and an outermost peripheral layer, or peripheral skin. The honeycomb structure comprises walls defining a plurality of cells comprising peripheral cells disposed directly adjacent to the peripheral skin, the peripheral cells being made up of parts of the walls intersecting with the peripheral skin. At one or more radial locations where certain walls intersect with each other proximate to the peripheral skin at a radial location, a transition web is disposed that connects the peripheral skin with the certain walls at the radial location, the transition web comprising opposing radii, wherein at least one of the opposing radii passes through an extension line extending along planes of the certain walls and comprising at least one undercut.

Another embodiment of the disclosure includes a honeycomb extrusion die. The honeycomb extrusion die comprises a peripheral skin-forming mask, and a die body comprising: an inlet face, an outlet face, and a plurality of pins disposed on the outlet face and arranged to define a matrix of intersecting slots disposed in the outlet face, the plurality of pins comprising peripheral pins disposed directly adjacent to the peripheral skin-forming mask, one or more of the peripheral pins being at least partially defined by a first pin surface, a second pin surface, and a third pin surface extending between the first pin surface and the second pin surface and extending alongside the peripheral skin-forming mask, the third pin surface having a continuously-varying radius extending from a first tangent with the first pin surface to a second tangent with the second pin surface.

Another embodiment of the disclosure includes a honeycomb extrusion die. The honeycomb extrusion die comprises a peripheral skin-forming mask and a die body. The die body comprises a plurality of pins including peripheral pins disposed directly adjacent to the peripheral skin-forming mask and central pins formed centrally in the die body wherein the plurality of pins defines a plurality of slots. The die body also comprises a skin-forming region disposed between the peripheral skin-forming mask and the die body, wherein sides of two adjacent peripheral pins define a first slot and a second slot, wherein the first slot and second slot intersect with one another at an intersection location directly proximate to the skin-forming region at a circumferential location, and a transition slot extending radially from the intersection location to the skin-forming region at the circumferential location, the transition slot including opposing radii including a first radius and second radius, wherein the first radius passes through a slot side extension line along the second slot and comprises a first undercut, and the second radius passes through a side extension line along the first slot and comprises a second undercut.

Another embodiment of the disclosure includes a method of manufacturing a honeycomb body comprising a honeycomb structure. The method of manufacturing the honeycomb structure comprises extruding batch material through an extrusion die to form honeycomb structure walls defining a plurality of cells comprising peripheral cells disposed directly adjacent to a peripheral skin, one or more of the peripheral cells being at least partially defined by a first wall surface, a second wall surface, and a skin surface portion of the peripheral skin extending between the first wall surface and the second wall surface, wherein the skin surface portion has a continuously-varying radius extending from a first tangent with the first wall surface to a second tangent with the second wall surface.

Another embodiment of the disclosure includes a method of manufacturing a honeycomb body comprising a honeycomb structure. The method of manufacturing the honeycomb body comprises extruding batch material through an extrusion die to form a honeycomb structure comprising walls defining a plurality of cells including peripheral cells disposed directly adjacent to a peripheral skin, and forming a transition web extending radially from an intersection location of a first wall with a second wall, the first wall and the second wall forming sides of two adjacent peripheral cells at a circumferential location, the transition web including having opposing radii including a first radius and second radius, wherein the first radius passes through an extension line along the second wall and comprises a first undercut, and the second radius passes through an extension line along the first wall and comprises a second undercut.

Additional features of the disclosure will be set forth in the description which follows, and in part will be apparent from the description, or may be learned by practice of the disclosure.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the description serve to explain the disclosure.

DETAILED DESCRIPTION

Figure 1A:
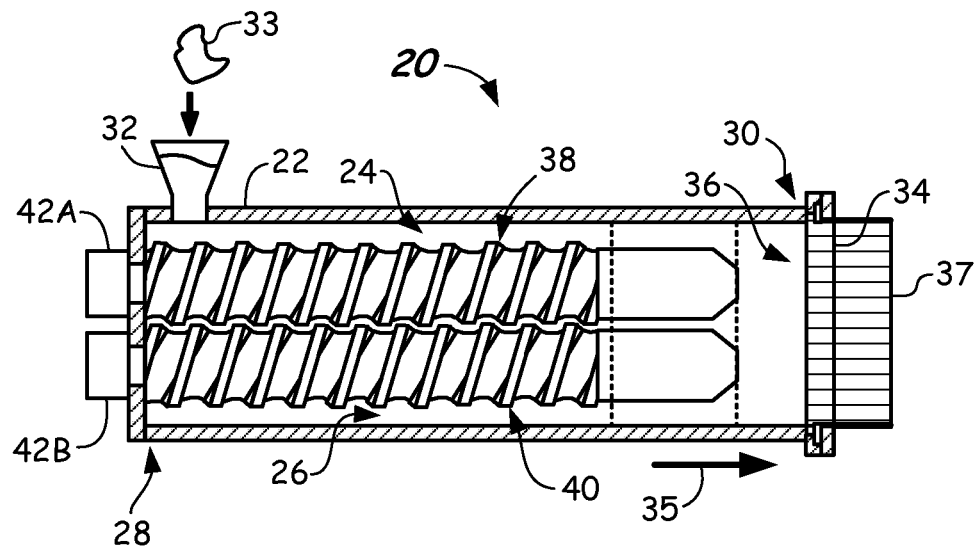
FIG. 1A illustrates a partially cross-sectioned side view of an extruder apparatus according to embodiments.

After-treatment of exhaust gas from internal combustion engines may use catalytic material or catalysts supported on high-surface area substrates and, in the case of some engines, a catalyzed or uncatalyzed filter for the removal of particles. Filters and catalyst substrates in these applications may be refractory, thermal shock resistant, stable under a range of partial pressure of oxygen $pO_2$ conditions, non-reactive with the catalyst system, and offer low resistance to exhaust gas flow. Porous ceramic flow-through honeycomb substrates and wall-flow honeycomb filters can be made utilizing the "honeycomb bodies" described herein.

A honeycomb body comprising a honeycomb structure can be formed from a batch mixture, for example, a ceramic-forming batch composition, which comprises inorganic materials that may include ceramics or ceramic precursors, or both, an organic binder (e.g., methylcellulose), and a liquid vehicle (e.g., water) and optional pore formers, rheology modifiers, and the like. When fired, the ceramic-forming batch composition is transformed or sintered into a porous ceramic material, for example, a porous ceramic suitable for exhaust after-treatment purposes. The formed ceramic(s) may be cordierite, aluminum titanate, mullite, combinations of cordierite, mullite, and aluminum titanate (e.g., such as cordierite, mullite, and aluminum titanate (CMAT)), alumina, silicon carbide, silicon nitride, and the like, and combinations thereof.

The honeycomb body comprising a honeycomb structure can be formed by an extrusion process where the ceramic-forming batch composition is extruded into a honeycomb extrudate, cut, dried, and fired to form the ceramic honeycomb structure. The extrusion process can be performed using a hydraulic ram extrusion press, a two stage de-airing single auger extruder, a twin-screw extruder with an extrusion die in a die assembly attached to a discharge end. Other suitable extruder apparatus or other devices may be used to form the honeycomb structures described herein.

Honeycomb extrusion dies employed to produce such honeycomb structures can be multi-component assemblies including, for example, a wall-forming die body combined with a skin-forming mask. For example, U.S. Pat. Nos. 4,349,329 and 4,298,328 disclose die structures including skin-forming masks. The die body preferably incorporates batch feedholes leading to, and intersecting with, an array of discharge slots formed in the die face, through which the ceramic-forming batch composition is extruded. The extrusion forms an interconnecting array of crisscrossing walls forming a central cellular honeycomb structure. A mask can be employed to form an outer peripheral skin. The mask can be a ring-like circumferential structure, such as in the form of a collar, defining the periphery of the skin of the honeycomb structure. The circumferential skin layer of the honeycomb structure can be formed by extruding the ceramic-forming batch composition between the mask and the central cellular honeycomb structure forming portion of the die body.

The extruded material, referred to as a honeycomb extrudate, can be cut to create the honeycomb bodies, such as to form honeycomb bodies comprising honeycomb structures shaped and sized to meet the needs of engine manufacturers. The honeycomb extrudate can alternatively be in the form of honeycomb segments, which can be connected or bonded together to form honeycomb structures. These honeycomb segments and resultant honeycomb structures can be any size or shape. As the honeycomb extrudates are extruded, an external extruded surface such as an external peripheral surface can be provided along the length of the honeycomb extrudate. In some embodiments, the ends of the honeycomb structure are not plugged, although certain passages may be plugged in a pattern if desired (e.g., to produce a honeycomb filter).

FIG. 1A shows a partially cross-sectioned side view of an embodiment of an extruder apparatus 20, such as a continuous twin-screw extruder apparatus. The extruder apparatus 20 includes a barrel 22 including a first chamber portion 24 and a second chamber portion 26 formed therein and in communication with each other. The barrel 22 can be monolithic or it can be formed from a plurality of barrel segments connected successively in the longitudinal (e.g., axial) direction. The first chamber portion 24 and the second chamber portion 26 extend through the barrel 22 in the longitudinal direction between an upstream side 28 and a downstream side 30. At the upstream side 28 of the barrel 22, a supply port 32, which can include a hopper or other material supply structure, may be provided for supplying a batch material 33 to the extruder apparatus 20. Batch material 33 can be provided to the supply port 32 in a continuous or semi-continuous manner by supplying batch material 33 in pugs, smaller globules, formed particles, or any other suitable form.

A honeycomb extrusion die 34 is provided at a discharge port 36 at the downstream side 30 of the barrel 22 for extruding the batch material 33 into a desired shape, such as honeycomb extrudate 37. The honeycomb extrusion die 34 may be coupled with respect to the discharge port 36 of the barrel 22, such as at an end of the barrel 22. The honeycomb extrusion die 34 can be preceded by other structures, such as a generally open cavity, a screen and/or homogenizer (not shown), or the like to facilitate the formation of a steady plug-type flow front before the batch material 33 reaches the honeycomb extrusion die 34.

As shown in FIG. 1A, a pair of extruder screws are mounted in the barrel 22. A first screw 38 is rotatably mounted at least partially within the first chamber portion 24 and a second screw 40 is rotatably mounted at least partially within the second chamber portion 26. The first screw 38 and the second screw 40 may be arranged approximately parallel to each other, as shown, though they may also be arranged at various angles relative to each other. The first screw 38 and the second screw 40 may also be coupled to driving mechanisms, such as drive motors, located outside of the barrel 22 for rotation in the same or different directions. It is to be understood that both the first screw 38 and the second screw 40 may be coupled via a transmission or gearing mechanism to a single driving mechanism (not shown) or, as shown, to individual driving mechanisms 42A, 42B. The first screw 38 and the second screw 40 move the batch material 33 through the barrel 22 with pumping and mixing action in an extrusion direction 35, which is also referred to as an axial direction.

Figure 1B:
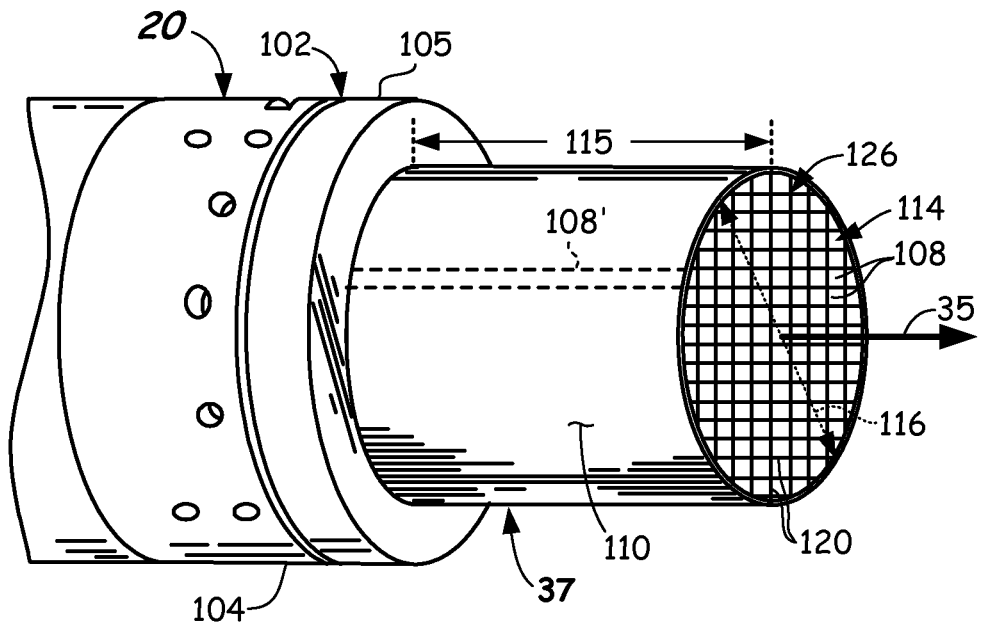
FIG. 1B illustrates a perspective side view of an extruder apparatus with a honeycomb extrudate being extruded therefrom according to embodiments.

FIG. 1B shows an end of the extruder apparatus 20 and a honeycomb extrudate 37 being extruded therefrom. The extruder apparatus 20 is shown with an extruder front end 102 where the batch material 33 exits the extruder apparatus 20 as the honeycomb extrudate 37. An extruder cartridge 104 located proximate the extruder front end 102 may include extrusion hardware such as a honeycomb extrusion die 34 (not shown in FIG. 1B) and a skin-forming mask 105. The honeycomb extrudate 37 includes a first end face 114 and a length 115 extending between the extruder front end 102 and the first end face 114. The honeycomb extrudate 37 may include a plurality of channels 108 and an outer peripheral skin surface 110 (skin). A plurality of intersecting walls 120 may intersect with each other and form the channels 108 that extend in the extrusion direction 35. For example, intersecting walls 120 forming a single channel 108' shown extending in the extrusion direction 35 are shown by dashed lines for illustration. A maximum cross-sectional dimension perpendicular to the axial direction 35 is indicated by dimension 116. For example, when the cross-section of the first end face 114 of the honeycomb extrudate 37 shown is circular, the maximum dimension 116 may be a diameter of the circular first end face 114. When the cross-section of the first end face 114 of the honeycomb extrudate 37 is rectangular, the maximum dimension 116 may be a diagonal of the rectangular first end face 114. The cross-sectional shape of the first end face 114 can be elliptical, race track shaped, square, rectangular non-square, triangular or tri-lobed, asymmetrical, symmetrical, or other desired shapes, and combinations thereof.

Upon exiting the extruder apparatus 20 in the axial direction 35, the honeycomb extrudate 37 may stiffen and include a honeycomb structure or a honeycomb matrix 126 of axially-extending intersecting walls 120 that form the axially-extending channels 108 and the axially-extending outer peripheral skin surface 110. The outer peripheral skin surface 110 may be a skin that is extruded along with the honeycomb matrix 126 from the same batch material 33 and can be an integrally formed co-extruded skin. The honeycomb extrudate 37 can be cut or otherwise formed into green honeycomb bodies comprising honeycomb structures. As used herein, green honeycomb structure refers to a dried extrudate prior to firing.

While extrusion is illustrated as horizontal orientation in FIG. 1B, this disclosure is not so limited and extrusion can be horizontal, vertical, or at some incline thereto.

Figure 2:
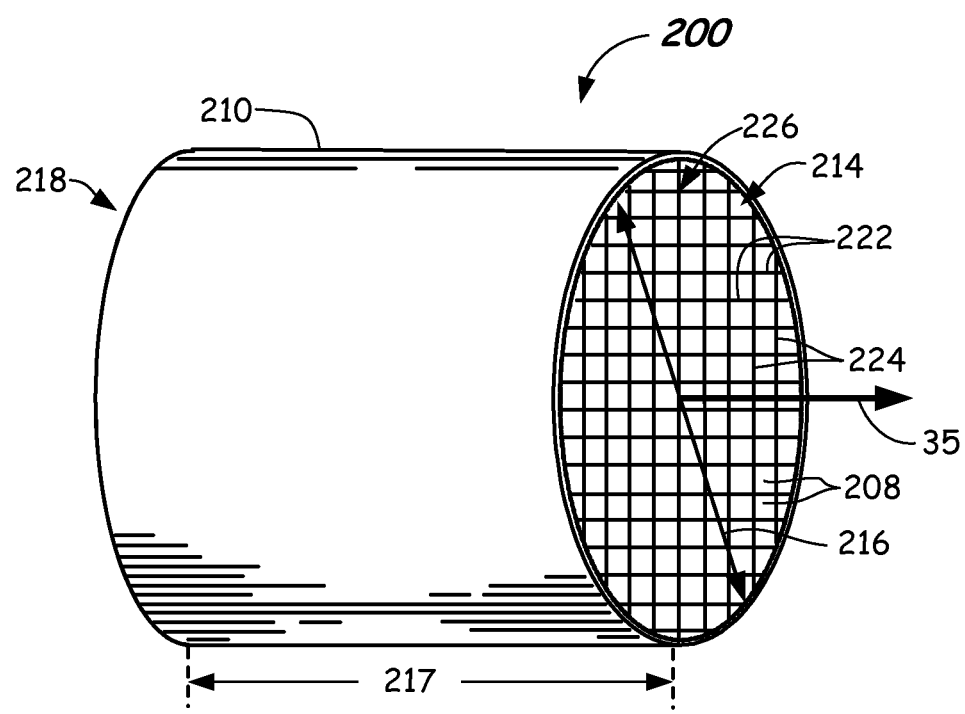
FIG. 2 illustrates an isometric view of a honeycomb structure according to embodiments.

With additional reference to FIG. 2, batch material 33 upon exiting the extruder front end 102 (FIG. 1B) is formed into a honeycomb extrudate 37 (FIG. 1B) that can be cut to length, dried, and fired thus forming a honeycomb body 200 of length 217 extending between a first end face 214 and a second end face 218. Cutting can be achieved by wire cutting, saw cutting, combinations of cutting and grinding such as with an abrasive wheel, cutting with a band saw or reciprocating saw, or other cutting method.

Cell density of the honeycomb structure of honeycomb body 200 (after firing) can be between about 100 cells per square inch (cpsi) and about 1,500 cpsi (between about 15.5 cells per square cm and about 232.5 cells per square cm). The intersecting walls 120 may have wall thicknesses ranging from about 0.038 mm to about 1.5 mm (about 1.5 mils to about 60 mils, where one mil is 0.001 inch). For example, the geometries of the honeycomb body 200 may be 400 cpsi with a wall thickness of about 8 mils (expressed as a 400/8 honeycomb configuration) or with a wall thickness of about 6 mils (400/6). Other geometries of the honeycomb body 200 include, for example, 100/17, 200/12, 200/19, 270/19, 600/4, 400/4, 600/3, 750/2, and 900/2.

The intersecting walls 120, after firing, may comprise a median pore diameter (MPD) of 10 µm≤MPD≤16 µm, or even 11 µm≤MPD≤15 µm in some embodiments. The breadth Db of the pore size distribution of the open, interconnected porosity may be Db≤1.5, or even Db≤1.0, wherein $Db=((D_{90}-D_{10})/D_{50})$, wherein $D_{90}$ is an equivalent spherical diameter in the pore size distribution of the intersecting walls 120 where 90% of the pores have an equal or smaller diameter and 10% have a larger diameter, and $D_{10}$ is an equivalent spherical diameter in the pore size distribution where 10% of the pores have an equal or smaller diameter, and 90% have a larger diameter. The median pore diameter (MPD) and breadth Db of the pore size distribution may be measured by mercury porosimetry, for example.

A plurality of first or horizontal walls 222 intersect a plurality of second or vertical walls 224 to form mutually adjoining channels 208 extending in the axial direction 35 between the opposing first end face 214 and the second end face 218 to form a honeycomb structure or honeycomb matrix 226 of intersecting walls 222, 224. The axial direction is indicated by arrow 35 and a maximum cross-sectional dimension perpendicular to the axial direction 35 is indicated by diameter 216. The axial direction 35 can extend normal to the first end face 214. The horizontal walls 222 and the vertical walls 224 intersect a peripheral skin 210. As described below, the intersection between the horizontal walls 222 and a peripheral skin 210 and the intersection between vertical walls 224 and the peripheral skin 210 may constitute weak portions in traditional honeycomb structures. However, as will be further described herein the honeycomb structures of honeycomb bodies 200 disclosed herein comprise wall-skin interface configurations that strengthen these intersections and the overall ISO strength of the honeycomb body 200.

The first end face 214 can be an inlet face and the second end face 218 can be an outlet face of the honeycomb body 200. The peripheral skin 210 of the honeycomb body 200 can extend axially between the first end face 214 and the second end face 218. In some embodiments described herein, the honeycomb body 200 can be excised from a longer log-shaped green honeycomb structure that can undergo further firing. In other embodiments, the green honeycomb structure can be an appropriately-sized green honeycomb structure substantially ready for firing and that produces the final length 217 after firing.

The horizontal walls 222 and vertical walls 224 forming channels 208 of the honeycomb body 200 may be coated in some embodiments. For example, if the honeycomb body 200 is used in a catalytic converter application, the horizontal walls 222 and the vertical walls 224 may be coated with a catalyst-containing coating, such as a wash coat for exhaust after-treatment. In such applications, the open and interconnected porosity (% P) of the horizontal walls 222 and the vertical walls 224 may be between 10% and 30% or between 15% and 25%. In other embodiments, the honeycomb body 200 may be used in a particulate filter application where the horizontal walls 222 and the vertical walls 224 are suitably porous (e.g., 30%-70% porosity) to allow exhaust gas to pass through the horizontal walls 222 and the vertical walls 224. For example, the open and interconnected porosity (% P) of the walls 120, after firing, may be % P≥40%, % P≥45%, % P≥50%, % P≥60%, or even % P≥65% in some embodiments. In some embodiments, the open and interconnected porosity of the walls 120 may be 35%≤% P≤70%, or even 40%≤% P≤60%, or even 45%≤% P≤55%. Other values of % P may be used. Porosity (% P) as recited herein is measured by a mercury porosity measurement method.

Thermal mass of exhaust after-treatment devices utilizing honeycomb bodies 200, such as substrates and filters for cleaning of exhaust gas, can play a role in determining catalytic performance. For example, during cold start stages and low temperature engine cycles, relatively thin walls and relatively high cpsi (providing relatively higher surface area) can improve fast light-off performance. Ever more stringent exhaust gas regulations highlight the long felt need for honeycomb bodies with lower thermal mass and greater heat exchange surface area as well as larger open frontal area for lower back pressure than traditional ceramic honeycomb structures.

The honeycomb bodies 200 disclosed herein have higher ISO strengths than traditional honeycomb structures. In some embodiments, the honeycomb body 200 may include a configuration having greater radii adjacent to the peripheral skin than traditional honeycomb structures. In some embodiments, some cells adjacent peripheral skins may include undercuts. In some embodiments, some cells adjacent peripheral skins may include combinations of undercuts and continually varying radii adjacent the peripheral walls. These undercuts and/or continually varying radii improve the ISO strength of the honeycomb bodies 200 relative to traditional honeycomb structures.

The honeycomb bodies 200 disclosed herein can also have improved chipping resistance while maintaining high thermal shock resistance and improved ISO strength. The functional improvements described herein may be applied to a plurality of different honeycomb structures including different cell shapes including, square channels, hexagonal channels, and Kagome lattices.

These and other embodiments of honeycomb bodies 200 according to the present disclosure are further described below with reference to FIGS. 1A-6 herein.

Figure 3A:
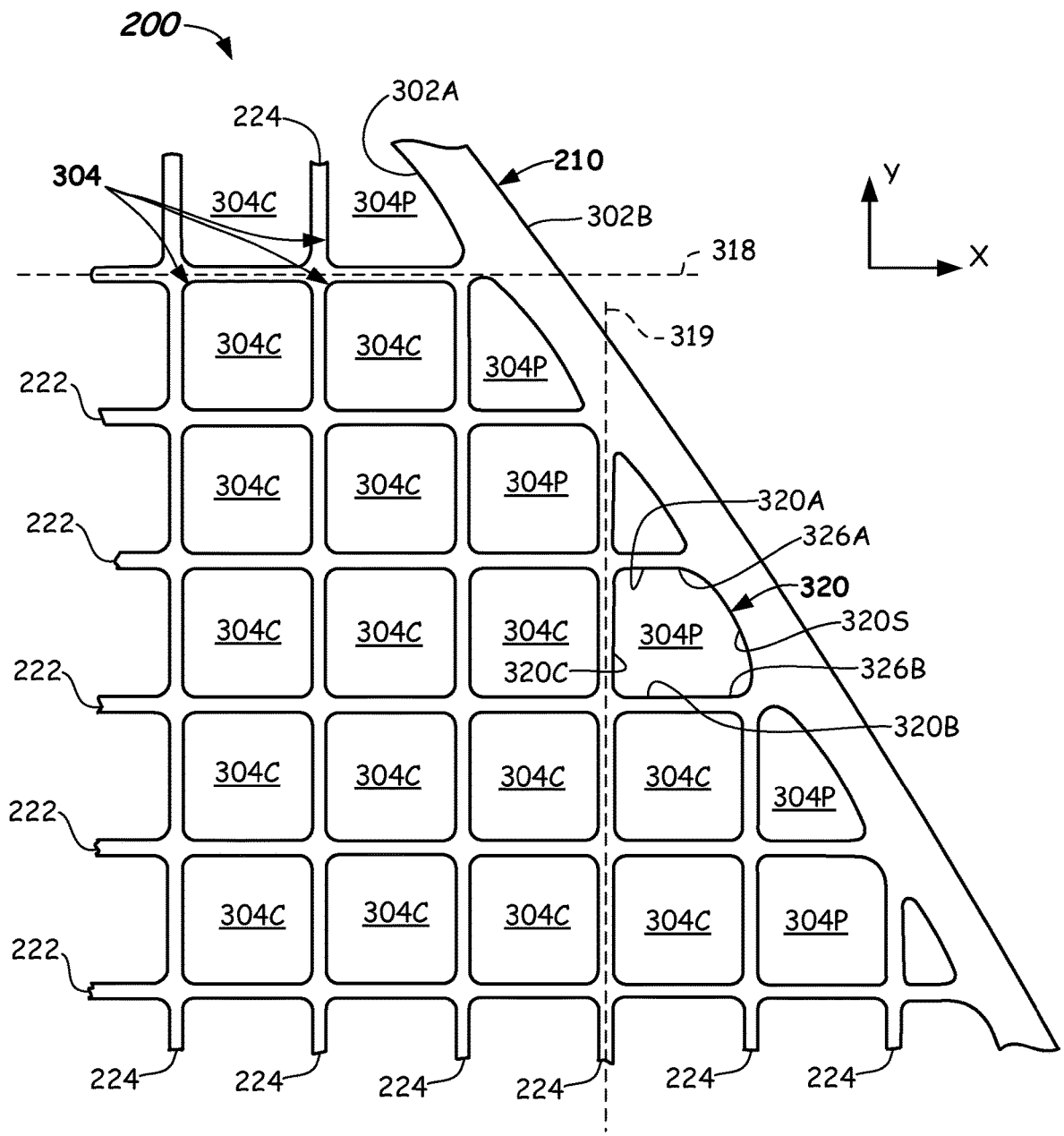
FIG. 3A illustrates an enlarged partial view of an end of a honeycomb structure including peripheral cells having continuously variable radii according to embodiments.

Reference is now made to FIG. 3A, which illustrates an enlarged partial portion of a first end face of the honeycomb body 200 illustrating the structural details proximate the peripheral skin 210 providing enhanced ISO strength. The peripheral skin 210 may include an inner surface 302A and an outer surface 302B. The distance between the inner surface 302A and the outer surface 302B of the peripheral skin 210 is the thickness of the peripheral skin 210. The thickness of the peripheral skin 210 can vary throughout the circumference of the honeycomb body 200. For example, the minimum thickness between the inner surface 302A and the outer surface 302B of a first peripheral cell may be different than a minimum thickness between the inner surface 302A and the outer surface 302B of a second peripheral cell. The honeycomb body 200 may comprise a plurality cells 304 including a plurality of central cells 304C and a plurality of peripheral cells 304P (some of which, but not all are labeled in the FIGS.). As described above, the cells 304 are openings that extend the length 217 (FIG. 2) of the honeycomb body 200. The peripheral cells 304P may have one or more sides that are adjacent to the inner surface 302A of the peripheral skin 210. For example, one side or wall of a peripheral cell 304P may be a portion of the inner surface 302A of the peripheral skin 210. In some embodiments, one or more portions of a peripheral cell 304P may be adjacent to the inner surface 302A of the peripheral skin 210.

The cells 304 may be formed from a plurality of intersecting walls such as horizontal walls 222 and vertical walls 224. The configuration or layout of the cells 304 depicted in FIG. 3A can comprise walls extending in an x-direction and a y-direction. One or more x-extending walls 222 extend along or parallel to an x-axis 318 and one or more y-extending walls 224 may extend along or parallel to a y-axis 319. As described herein, some of the horizontal walls 222 and vertical walls 224 may deviate from the x-axis 318 and the y-axis 319 proximate the peripheral skin 210 to provide strength to the honeycomb body 200. One or more x-extending walls 222 may intersect one or more y-extending walls 224 at right angles. Other honeycomb structures may include different cell shapes including walls that intersect at other angles. For example, other honeycomb structures may include rectangular non-square cell shapes, triangular cell shapes, hexagonal shapes, or combinations thereof. Yet other honeycomb structures may be configured radially and may include trapezoid-shaped cells.

One or more of the peripheral cells 304P may include features that increase the strength of the honeycomb body 200. Additional reference is made to FIG. 3B, which shows an enlarged view of some of the peripheral cells 304P and central cells 304C. Peripheral cells 304P may have different shapes, whereas central cells 304C may have the same shape in transverse cross-section. One representative type of peripheral cell 304P (also labeled 320 for illustration purposes) shows at least some of these features that improve the strength of the honeycomb body 200. The peripheral cell 320 may comprise a first wall surface 320A located on a first wall 222, a second wall surface 320B located on a second wall 222 lying adjacent to the first wall 222, and a third wall surface 320C located on a third wall 224. A skin surface portion 320S may extend between the first wall surface 320A and the second wall surface 320B.

The first wall surface 320A may comprise a first tangent 326A and the second wall surface 320B may comprise a second tangent 326B. The skin surface portion 320S may be curved between the first tangent 326A with the first wall surface 320A and the second tangent 326B with the second wall surface 320B and comprises a continuously-varying radius 352 extending entirely between the first tangent 326A with the first wall surface 320A and the second tangent 326B with the second wall surface 320B. In some embodiments, the continuously-varying radius is non-symmetrical (See FIG. 4C). Thus, the skin surface portion 320S has a continuously-varying radius 352 extending between a first point on the skin surface portion 320S and to a second point on the skin surface portion 320S.

Figure 3B:
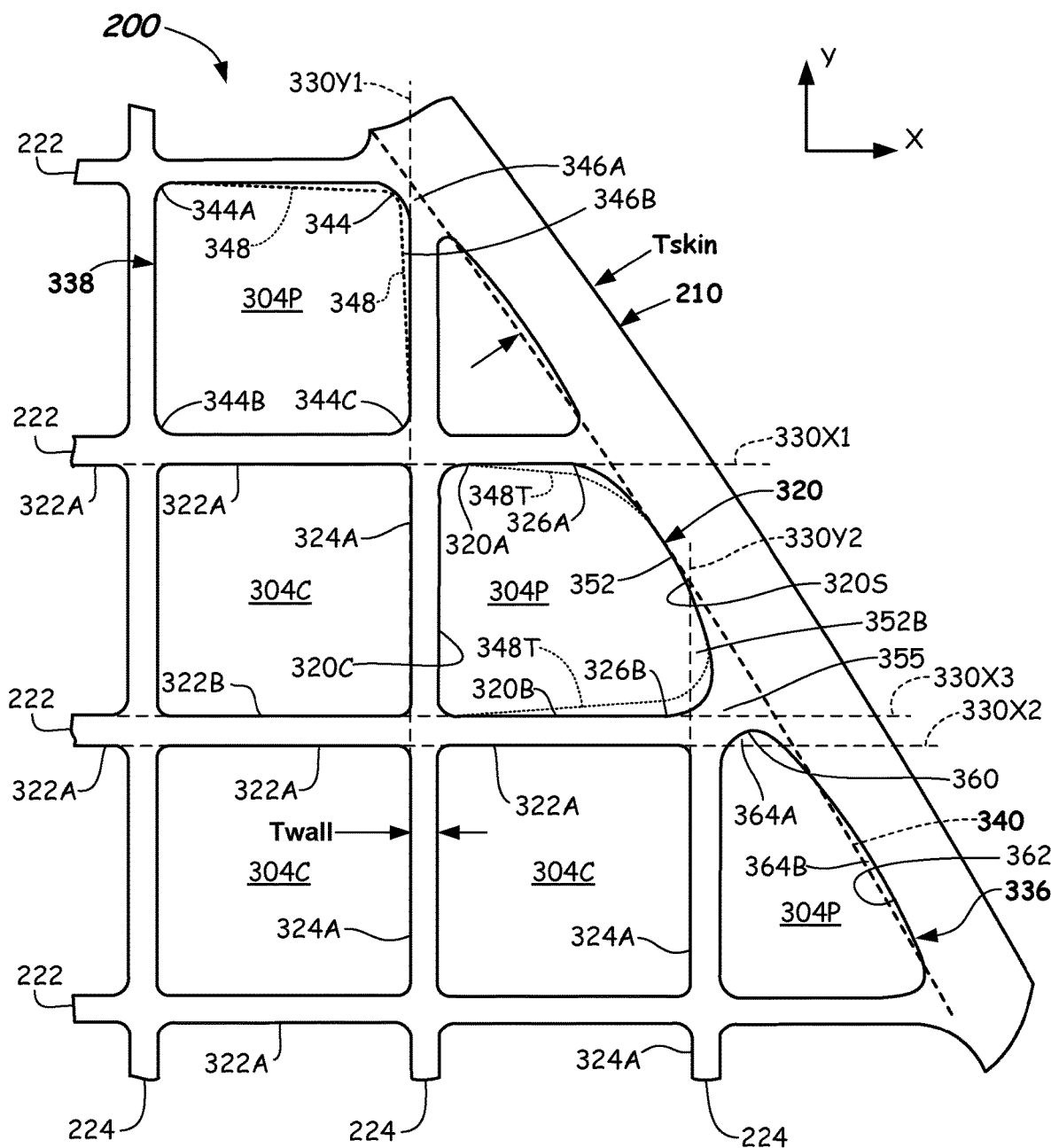
FIG. 3B illustrates an enlarged view of a honeycomb structure including peripheral cells adjacent to a peripheral skin according to embodiments.

FIG. 3B shows extension lines extending along the x-direction and the y-direction to provide references to interior wall surfaces of the central cells 304C. An extension line 330X1 and an extension line 330X2 extend in the x-direction. FIG. 3B also shows an extension line 330Y1 and an extension line 330Y2 extending in the y-direction. The extension line 330X2 extends along wall surface 322A and wall planes of some of central cells 304C and provides a reference to show undercutting in the y dimension of a peripheral cell 304P (also labeled 336 for illustration purposes) in accordance with one aspect described herein. The extension line 330Y2 extends along wall surfaces 324A and wall planes of some of the central cells 304C and provides a reference to show undercutting in the x dimension of a peripheral cell 304P (also labeled 320 for illustration purposes).

The extension line 330X1 extends along wall surfaces 320A and wall surfaces 322A of some of the walls 222 of central cells 304C and provides a reference to show tangency with the first tangent 326A of the peripheral cell 320. The extension line 330Y2 extends along wall surfaces 324A of some of the central cells 304C and provides a reference to show additional undercutting in the peripheral cell 320 in the x direction. The extension lines may show where the peripheral cells 304P would otherwise have similar shapes as peripheral cells in traditional honeycomb structures but for modifications (e.g., undercuts and radiuses) described herein.

In some embodiments, some of the corner radii in the peripheral cells 304P may differ from those in the central cells 304C and from traditional honeycomb structures so as to increase the ISO strength of the honeycomb body 200 proximate the peripheral skin 210.

A reference line 340 is shown in FIG. 3B to aid in illustrating examples of further structural differences in the peripheral cells 304P relative to traditional honeycomb structures. Specifically, the reference line 340 illustrates inner skin surface locations of traditional peripheral cells wherein the skin thickness Tskin is constant and between 3× and 4× the transverse thickness Twall of the walls 222, 224. Thus, in comparison to reference line 340, the structure of the peripheral cells 304P directly adjacent to the peripheral skin 210 that have been changed can be seen. The changes to the structure of the peripheral cells 304P relative to the reference line 340 further increase the ISO strength of the honeycomb body 200 relative to traditional honeycomb structures. The skin thickness of the peripheral skin 210 may be non-constant about a circumference of the honeycomb body 200. In some embodiments, the average skin thickness Tskin about a circumference of the honeycomb body 200 may be between about 0.1 mm to 100 mm, or even between 1 mm to 10 mm, for example.

Figure 4A:
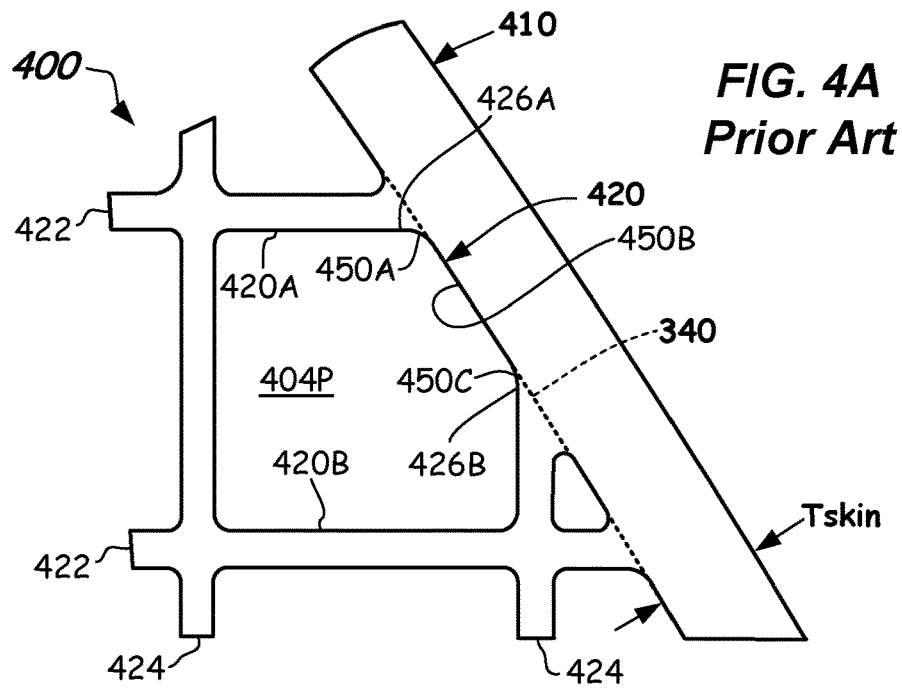
FIG. 4A illustrates an end plan view of a portion of a traditional honeycomb structure showing small radiuses between the walls and the peripheral skin.
Figure 4B:
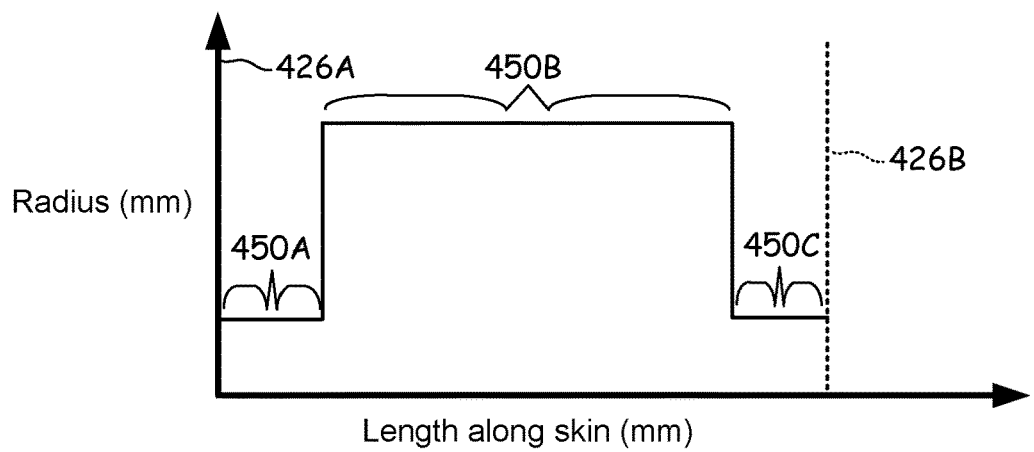
FIG. 4B illustrates a plot of radius size along a portion of an inner surface of the peripheral skin.

Traditional honeycomb structures 400 (FIG. 4A) use fillets having small corner radii in the peripheral cells 404P adjacent to the peripheral skin 410, such as shown in the portion of a traditional honeycomb structure 400 of FIG. 4A. Reference is made to peripheral cell 420 for illustration purposes. These small radii 450A, 450C are provided at the corners of the intersections of the walls 422, 424 with the peripheral skin 410 of a traditional honeycomb with a constant thickness Tskin of the peripheral skin. These traditional configurations of peripheral cells 404P result in some intersections between walls 422, 424 and the peripheral skin 410 being high stress points. FIG. 4B illustrates a plot of the radius along the inner skin surface between a first tangent 426A with the first wall 420A and a second tangent 426B with a second wall 420B of the peripheral cell 404P. As shown, the radius along the skin 450B is the radius of the inner skin and is a constant value between the two corner radii 450A, 450C, which are shown as being approximately the same radius. These intersections, even though including corner radii, can be high stress points that can cause chipping, skin separation, cracking, and other unwanted conditions of the traditional honeycomb structures 400. The honeycomb bodies 200 described herein disclose peripheral cells 304P that provide improved ISO strength in comparison to the traditional honeycomb structure 400.

In one aspect, and again referring to FIG. 3B, a peripheral cell 338 (also generically labeled 304P) comprises a fillet 344 (corner radius) adjacent the peripheral skin 210 with a corner radius value that is greater than the corner radii values of other fillets of the peripheral cell 338, such as fillet 344A, fillet 344B, and fillet 344C, in the peripheral cell 338. The corner radius value of the fillet 344 is greater than the radius of a fillet of a traditional fillet in the same location. For example, the corner radii of the fillets 344A, 344B, 344C may be approximately 3 mils (0.08 mm) and the corner radius of the fillet 344 may have a maximum value of 8 mils (0.2 mm). In some embodiments, the corner radius value of the fillet 344 may be 100% greater, or even 200% greater, than the corner radius value of any one of the other fillets 344A, 344B, 344C. In some embodiments, the corner radius value of the fillet 344 may be 100% to 300% greater than the corner radius value of the other fillets 344A, 344B, 344C. Fillets 344A, 344B, 344C can be of the same corner radius value. The radius of the fillets 344, 344A, 344B, 344C may be provided as a measure of curvature, which is the inverse of radius. The curvature of the peripheral cell 338, including the fillets 344, 344A, 344B, 344C, may range between 0.0 and 10.0. In other embodiments, the curvature may range between 0.0 and 5.0 or between 0.0 and 1.0.

In some embodiments, the corner radii of the fillets adjacent to the peripheral skin 210 are changed relative to the corner radii of fillets of traditional peripheral cells without increasing or decreasing the material used in the honeycomb body 200. This can be achieved by allowing some of the radii to extend beyond the reference line 340, while others just extend to that reference line 340 or fall slightly short of that line. In other embodiments, the material used in the honeycomb body 200 may be slightly greater than or less than traditional honeycomb structures. However, by maintaining substantially the same volume of the honeycomb body 200, the thermal mass of the honeycomb body 200 does not change or changes very little in comparison to traditional honeycomb structures.

In some embodiments, the radius of the fillet 344 may be increased relative to a traditional fillet, at least in part, by increasing an area 346A between the fillet 344 and the reference line 340. The area 346A may also be increased by enlarging the wall thickness of a tapered wall portion 348 of wall 224 as the tapered wall approaches the peripheral skin 210 thus increasing an area 346B between a tapered wall portion 348 of the peripheral cell 338 and the extension line 330Y1. In this instance, the fillet 344 can be made the same as fillets 344A-344C, for example. Wall 222 can also be made to comprise a tapered wall portion 348. In some embodiments, the enlarged thickness of the tapered wall portion 348 near the peripheral skin 210 can be achieved by locally removing material from certain sides of the pins of the extrusion die.

Figure 4C:
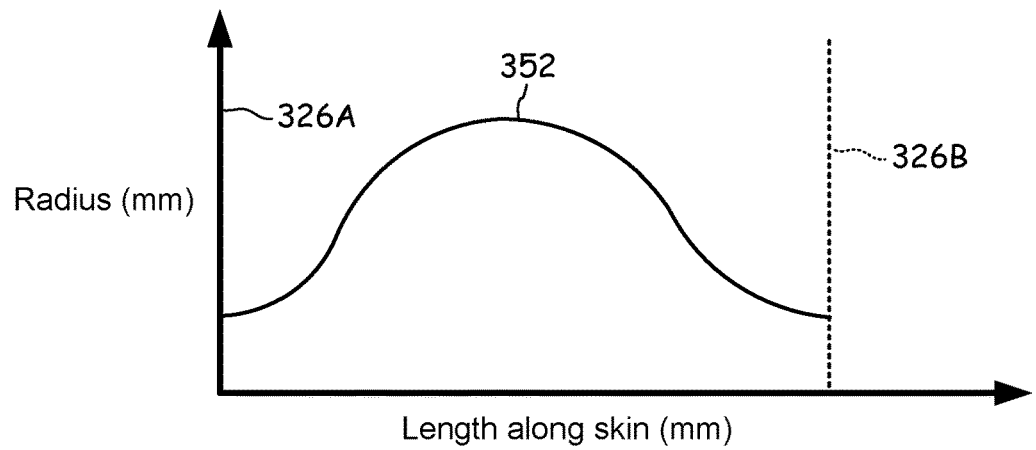
FIG. 4C illustrates a plot of radius size along a portion of an inner surface of the peripheral skin according to according to one or more embodiments.

Reference is now made to the peripheral cell 320 of FIGS. 3A and 3B. As shown by the extension line 330X1, the reference line 340, and the extension line 330X3, a continuously-varying radius 352 is provided that defines the skin surface portion 320S extending between the first tangent 326A with the first wall surface 320A and the second tangent 326B with the second wall surface 320B. To better illustrate the differences between the traditional peripheral cell 404P (FIG. 4B) and the peripheral cell 304P shown in FIG. 3A-3B, FIG. 4C is provided. In that plot, the continuously-varying radius 352 is shown such that it extends along the length of the peripheral skin 210 between the first tangent 326A and the second tangent 326B. Because of the smooth transition and continuously-variable radius, stress concentrations at the peripheral skin 210 are dramatically reduced as compared to traditional honeycomb structures 400. In another aspect, the peripheral cell 320 can comprise a tapered wall portion 348T on walls 222, which in combination can further reduce stress.

As shown by the extension line 330Y2, the continuously-varying radius 352 is provided and produces an undercut 352B in the X direction relative to extension line 330Y2. Specifically, area has been removed relative to a traditional honeycomb structure to create the undercut 352B. In some embodiments, the continuously-varying radius 352 can just extend to the reference line 340, as shown.

Reference is now made to peripheral cell 336, which is adjacent to peripheral cell 320. Peripheral cell 336 comprises a fillet 360 and a curved skin surface portion 362. The radius of the fillet 360 can be positioned relative to the extension line 330X2 may to form an undercut 364A above the extension line 330X2. In addition, the skin surface portion 362 may comprise an undercut 364B in the peripheral skin 210 relative to the constant skin thickness reference line 340. Thus, as should be recognized, the peripheral skin 210 is not constant thickness around the circumference of the honeycomb body 200, but instead comprises a varying thickness skin about a circumference of the honeycomb body 200. The curvature of the skin surface portion 362 of peripheral cell 336 may have a radius that varies over the length of the skin surface portion 362. Accordingly, this curvature may not be an arch having a single radius, but may be curved so as to have a complex radius that changes continuously from a tangent with wall 224 at the top to a tangent with wall 222 at the bottom. As a result, a transition web 355 can be formed that transitions any applied stress to the peripheral skin 210 at substantially 90 degrees. In some embodiments, the radius of the curvature of the skin surface portion 362 forming the undercut 364B may be constant. The transition web 355 can be radially oriented, as shown.

The fillets in the honeycomb body 200 may not necessarily be larger than fillets in traditional honeycomb structures. Rather, the radii of the fillets may be changed in a way that stress is spread throughout the honeycomb body 200, such as through the peripheral skin 210. This spreading of the stress increases the ISO strength of the honeycomb body 200.

In some embodiments, when a wall interfaces with the peripheral skin 210 at an oblique angle, the associated fillet may have an increased radius. The increased radius provides a more gradual change in the shape of the peripheral cell 304P containing the fillet. In some embodiments, when a web or wall interfaces with the peripheral skin 210 at an acute angle, the fillet may be undercut as shown by the undercut 364A. In some embodiments, one or more of the skin surface portions of the peripheral cells may be curved or arched.

The radii of the fillets described herein may be provided as a measure of curvature, which is the inverse of radius. The curvature of the peripheral cells 304P, including the fillets in the peripheral cells 304P may range between 0.0 and 10.0. In other embodiments, the curvature may range between 0.0 and 5.0 or between 0.0 and 1.0.

Figure 3C:
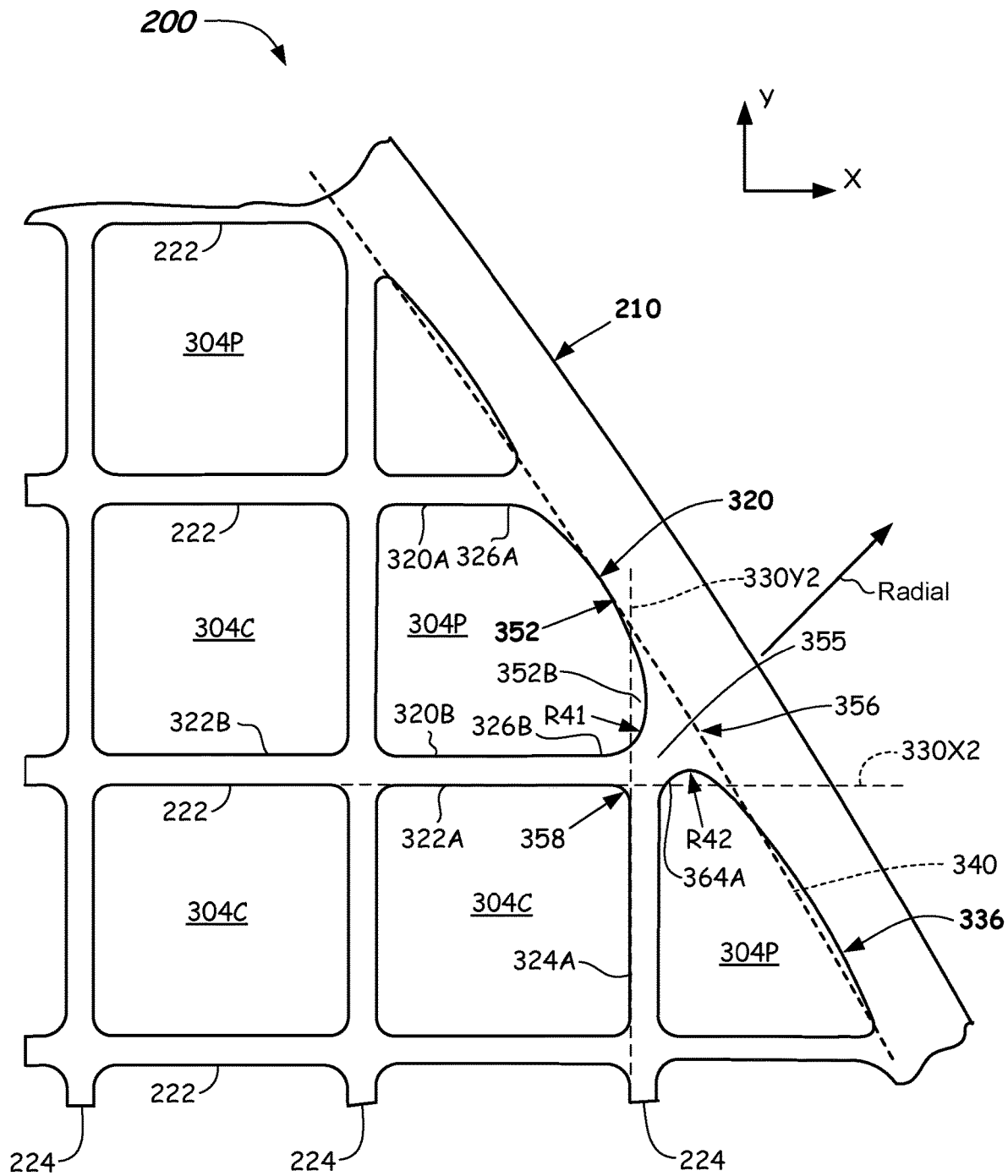
FIG. 3C illustrates an enlarged view of a honeycomb structure showing a transition web extending between a peripheral skin and intersections of walls according to embodiments.

Reference is now made to FIG. 3C, which shows a transition web 355 in the honeycomb body 200. The transition web 355 is located at a circumferential location 356 relative to the peripheral skin 210 between a first peripheral cell 320 and a second peripheral cell 336. The transition web 355 extends radially from the peripheral skin 210 to join a first wall 222 and a second wall 224 at an intersecting location 358. The first wall 222 and the second wall 224 at least partially form the first peripheral cell 320 and the second peripheral cell 336. In the embodiment depicted in FIG. 3C, the first wall 222 extends in the x-direction and the second wall 224 extends in the y-direction.

The extension line 330Y2 extends in the Y-direction along a surface plane 324A of the second wall 224, which comprises at least one of the central cells 304C. An extension line 330X2 extends in the X-direction along a surface plane 322A of the first wall 222, which comprises at least one of the central cells 304C. The transition web 355 may be formed by the first undercut 352B in the first peripheral cell 320 relative to the extension line 330Y2. The first undercut 352B may have a first radius R41 along the undercut region. In some embodiments, the first radius R41 is complex and changes continuously throughout the extent of the first undercut 352B. The transition web 355 may comprise a second undercut 364A relative to the extension line 330X2 in the second peripheral cell 336. The second undercut 364A may have a second radius R42. In some embodiments, the second radius R42 is complex and changes continuously throughout the extent of the second undercut 364A. The first radius R41 and the second radius R42 may be referred to as opposing radii. The transition web 355 provides additional strength to the honeycomb body 200. For example, the radially-oriented configuration of the transition web 355 may improve the ISO strength of the honeycomb body 200 relative to traditional honeycomb structures having non-radial configurations.

Figure 5A:
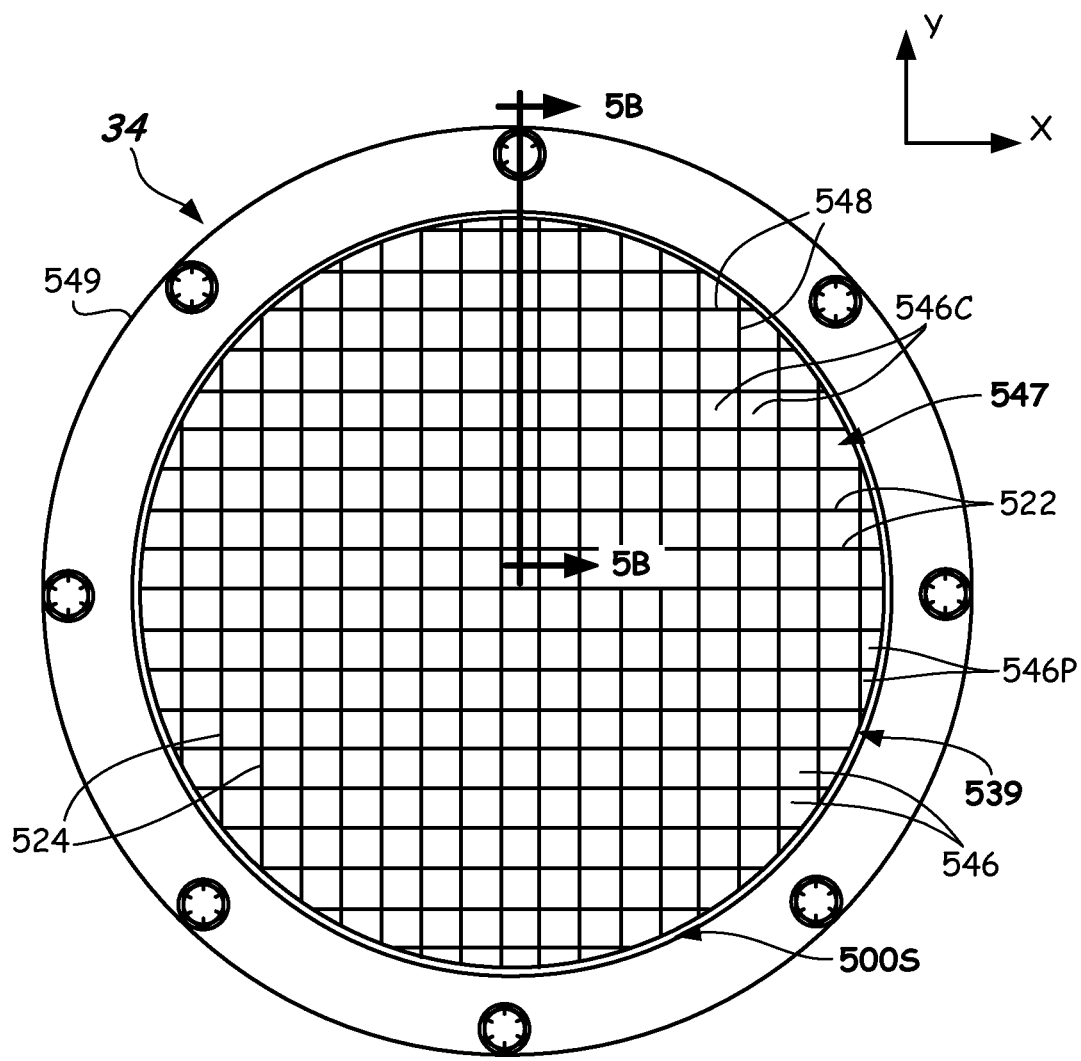
FIG. 5A illustrates a front plan view of a front face of an extrusion die configured to extrude honeycomb structures according to one or more embodiments.
Figure 5B:
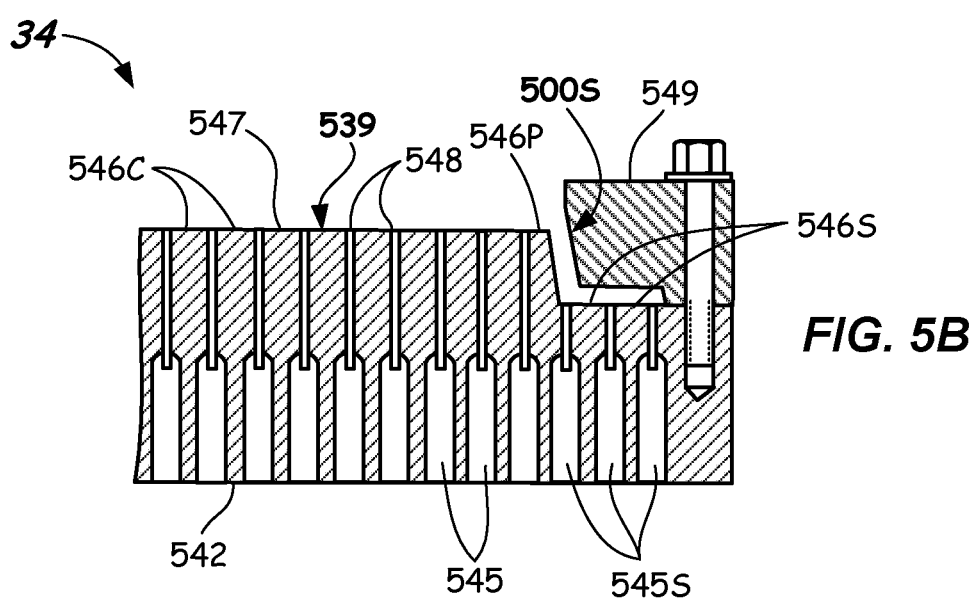
FIG. 5B illustrates a partial cross-sectional view of the extrusion die of FIG. 5A taken along section line 5B-5B of FIG. 5A according to embodiments.

Referring now to FIGS. 5A and 5B, an embodiment of the honeycomb extrusion die 34 (FIG. 1A) is shown in greater detail. The honeycomb extrusion die 34 can be configured to manufacture the honeycomb body 200 (FIGS. 2, 3A-3C) and other honeycomb structures according to embodiments of the disclosure. The honeycomb body 200 may be formed by extrusion of a plasticized batch, which is described, for example, in U.S. Pat. Nos. 3,885,977, 5,332,703, 6,391,813, 7,017,278, 8,974,724, WO2014/046912, and WO2008/066765, through the honeycomb extrusion die 34 to produce a honeycomb extrudate 37 (FIG. 1). The honeycomb extrudate 37 may then be cut and dried, such as described in U.S. Pat. Nos. 9,038,284, 9,335,093, 7,596,885, and 6,259,078, for example. The thus produced green honeycomb structure may then be fired, such as described in U.S. Pat. Nos. 9,452,578, 9,446,560, 9,005,517, 8,974,724, 6,541,407, and 6,221,308 to form the honeycomb body 200 including the structural geometry and microstructure described herein.

The honeycomb extrusion die 34 can comprise a die body 539, a die inlet face 542 configured to receive plasticized batch, and a die outlet face 547 opposite from the die inlet face 542 and configured to expel plasticized batch in the form of a honeycomb extrudate 37. The honeycomb extrusion die 34 can be coupled to the extruder apparatus 20 (FIGS. 1A-1B) as described above.

The honeycomb extrusion die 34 may comprise a plurality of feedholes 545 (a few labeled) extending from the die inlet face 542 into the die body 539 and intersecting with an array of slots 548 (a few labeled) extending into the die body 539 from the die outlet face 547. A plurality of pins 546 define the slots 548 and the slots 548 are located between respective ones of the pins 546. The slots 548 may be arranged to form the honeycomb bodies 200 described herein, including the central cells 304C and the peripheral cells 304P. The honeycomb extrusion die 34 may comprise central pins 546C configured to form the central cells 304C, and may comprise peripheral pins 546P configured to form the peripheral cells 304P.

The feedholes 545 supply batch material to the array of slots 548. The intersecting array of slots 548 comprises X-extending slots 522 (a few labeled in FIG. 5A) and Y-extending slots 524 (a few labeled in FIG. 5A). The honeycomb extrusion die 34 may comprise a skin-forming portion 500S adjacent to the peripheral pins 546P formed between the peripheral pins 546P and a peripheral skin-forming mask 549. The peripheral skin-forming mask 549 can be a ring-shaped article that is coupled to the die body 539. The skin-forming portion 500S interfaces with skin-forming feedholes 545S to form the outer peripheral skin surface 110 (FIG. 1B) on the honeycomb extrudate 37 during the extrusion method.

Figure 5C:
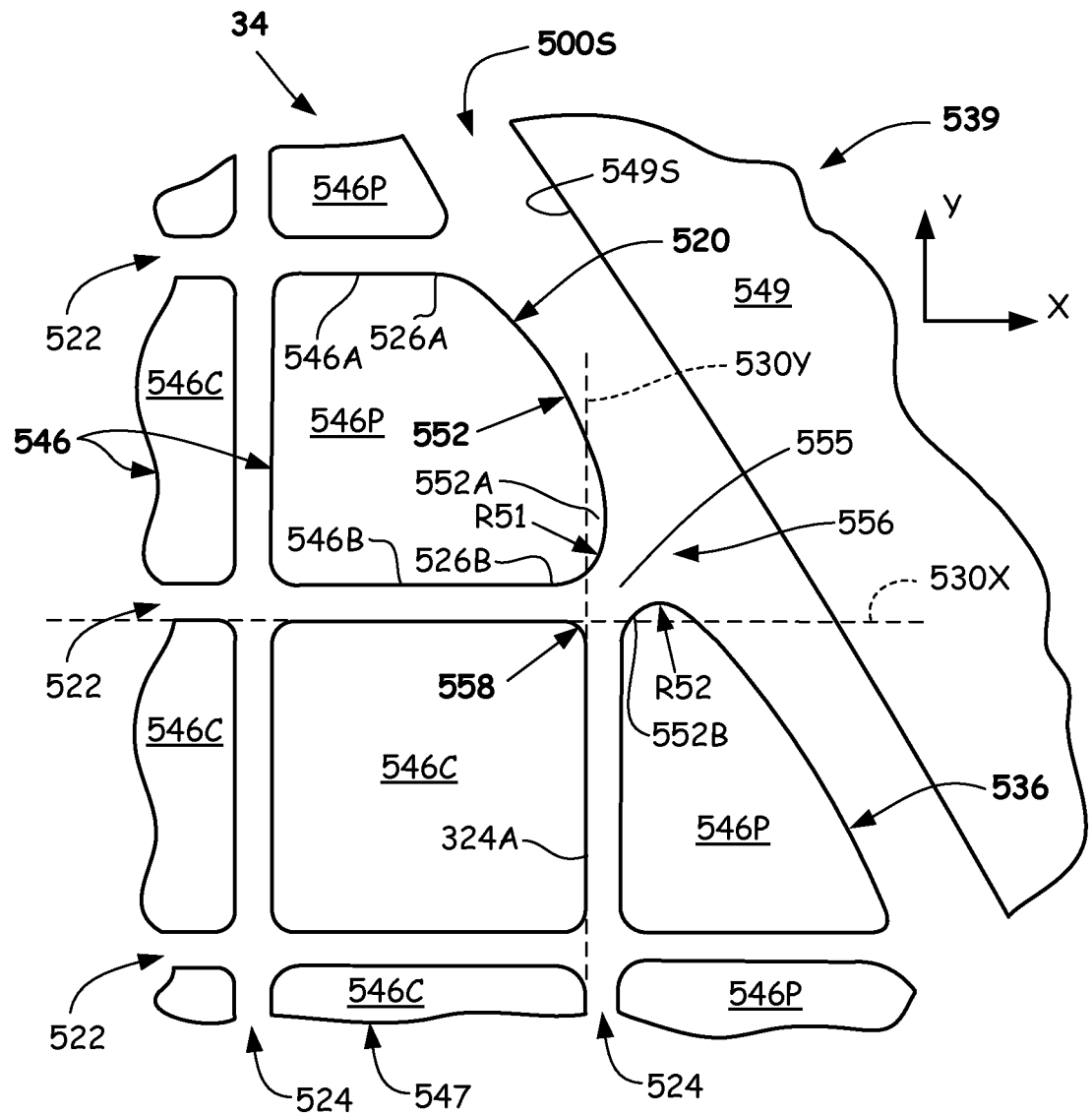
FIG. 5C illustrates a partial end view of a portion of the extrusion die of FIG. 5A adjacent to a skin-forming region according to embodiments.

As can be seen in FIG. 5A-5B and enlarged FIGS. 5C, the honeycomb extrusion die 34 comprises a peripheral skin-forming mask 549, and a die body 539. The die body 539 comprises a die inlet face 542, a die outlet face 547, and a plurality of pins 546 disposed on the die outlet face 547. The plurality of pins 546 are arranged to define a matrix of intersecting slots 522, 524 formed in the die outlet face 547 through which batch material 33 can be extruded. The plurality of pins 546 comprise peripheral pins 546P disposed directly adjacent to the peripheral skin-forming mask 549 and central pins 546C, which are not disposed directly adjacent to the peripheral skin-forming mask 549, but rather centrally located in the die body 539. One or more of the peripheral pins 546P are at least partially defined by a first pin surface 546A, a second pin surface 546B, and a third pin surface 546S extending between the first pin surface 546A and the second pin surface 546B. The third pin surface 546S extends alongside the external skin forming surface 549S of the peripheral skin-forming mask 549. The third pin surface 546S has a continuously-varying radius 552 extending from a first tangent 526A with the first pin surface 546A to a second tangent 526B with the second pin surface 546B.

The honeycomb extrusion die 34 may further comprise a first slot 522 and a second slot 524 forming sides of a pin 520 and pin 536 that are adjacent. The first slot 522 and the second slot 524 intersect with one another at an intersection location 558 directly proximate to the skin-forming portion 500S at a circumferential location 556. A transition slot 555 may extend radially from the intersection location 558 to the skin-forming portion 500S at the circumferential location 556. The transition slot 555 may comprise opposing radii including a first radius R51 and second radius R52. The first radius R41 may pass through a slot side extension line 530Y along the second slot 524 and comprises a first undercut 552A. The second radius R52 may pass through a side extension line 530X along the first slot 522 and may comprises a second undercut 552B.

Figure 6:
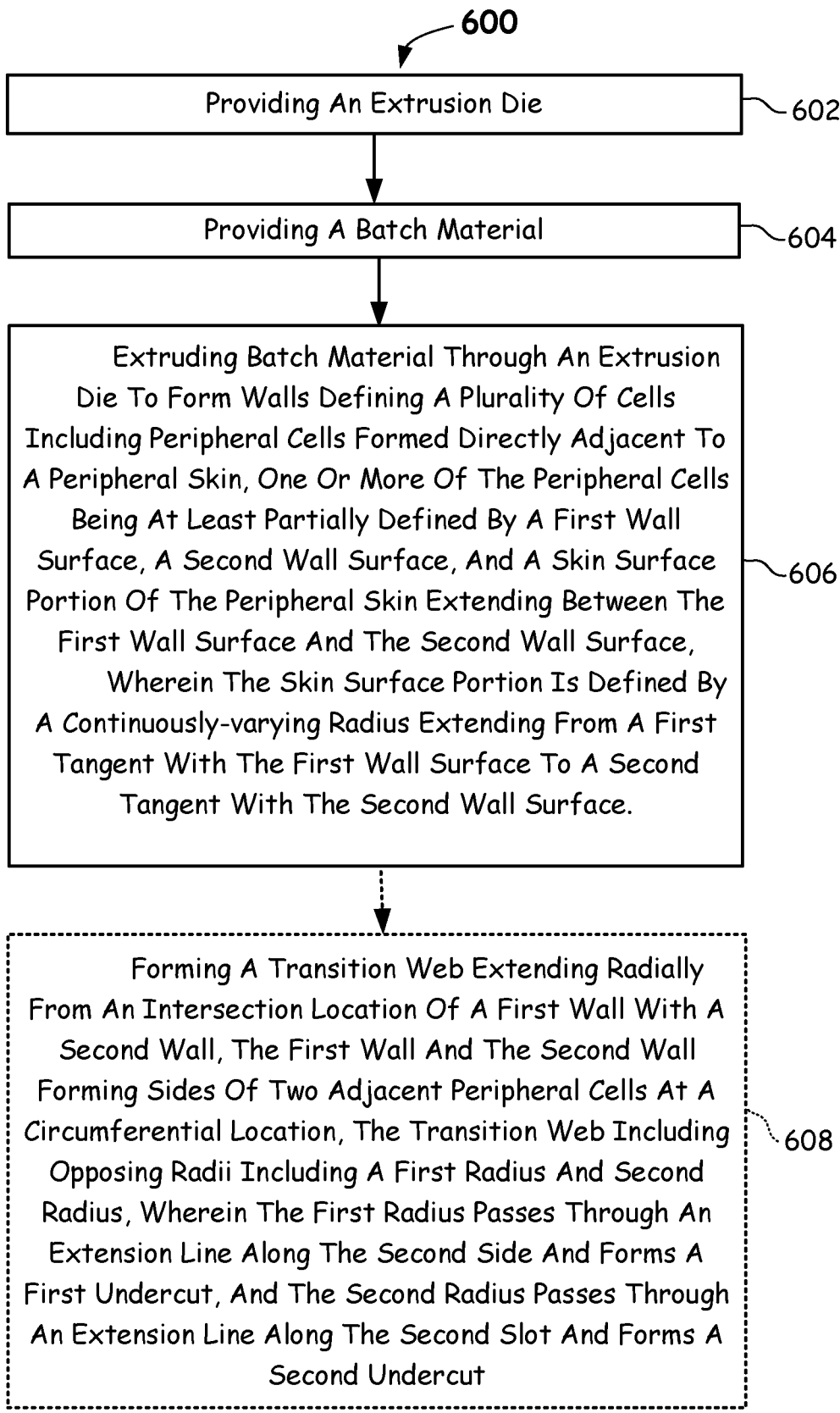
FIG. 6 illustrates a flowchart of a method of manufacturing a honeycomb structure according to embodiments.

In another aspect, a method of manufacturing a honeycomb structure is provided. The method 600 of manufacturing a honeycomb structure (e.g., honeycomb body 200), as best shown in FIG. 6, comprises, in 602, providing an extrusion die (e.g., honeycomb extrusion die 34), and, in 604, providing a batch material (e.g., batch material 33).

The method 600 further comprises, in 606, extruding the batch material through an extrusion die to form walls (e.g., walls 222, 224) defining a plurality of cells including peripheral cells (e.g., peripherals cells 304P) disposed directly adjacent to a peripheral skin (e.g., peripheral skin 210), one or more of the peripheral cells (e.g., peripheral cell 320) being at least partially defined by a first wall surface (e.g., first wall surface 320A), a second wall surface (e.g., second wall surface 320B), and a skin surface portion (e.g., skin surface portion 320S) of the peripheral skin extending between the first wall surface and the second wall surface, wherein the skin surface portion is defined by a continuously-varying radius (e.g., continuously-varying radius 352) extending from a first tangent (e.g., first tangent 326A) with the first wall surface to a second tangent (e.g., second tangent 326B) with the second wall surface.

The method 600 may also comprise, in 608, forming a transition web (e.g., transition web 355—FIG. 3C) extending radially (along a line connecting corners of the central cells 304C) from an intersection location (e.g., intersecting location 358) of a first wall (e.g., first wall 222) with a second wall (e.g., second wall 224), the first wall and the second wall forming sides of two adjacent peripheral cells (e.g., peripheral cells 320, 336) at a circumferential location (e.g., circumferential location 356), the transition web including opposing radii including a first radius (e.g., first radius R41) and second radius (e.g., second radius R42), wherein the first radius passes through an extension line (e.g., extension line 330Y2) along the second wall and comprises a first undercut (e.g., first undercut 352B), and the second radius passes through an extension line (e.g., extension line 330X2) along the first wall and comprises a second undercut (e.g., second undercut 364A).

The foregoing description discloses only example embodiments of the disclosure. Modifications of the above disclosed apparatus and methods which fall within the scope of the disclosure will be readily apparent to those of ordinary skill in the art. Accordingly, while the present disclosure has been described in connection with example embodiments thereof, it should be understood that other embodiments may fall within the scope of the disclosure, as defined by the claims.

What is claimed is:

1. A honeycomb body comprising a honeycomb structure and
a peripheral skin;
wherein the honeycomb structure comprises an interconnecting array of walls defining a plurality of central cells comprised of first parallel walls extending in an axial direction and configured in an x-direction in a transverse cross-sectional plane ("x-y plane") perpendicular to the axial direction ("x-extending walls") and intersecting at right angles with second walls configured in a y-direction in the x-y plane ("y-extending walls"), the honeycomb structure further comprising a plurality of peripheral cells disposed directly adjacent to the peripheral skin,
wherein the peripheral skin forms at least part of at least some of the peripheral cells,
wherein intersections of the x-y plane and first wall surfaces of the x-extending walls of the central cells lie on or are parallel to an x-extending reference line in the x-y plane, and
wherein intersections of the x-y plane and second wall surfaces of the y-extending walls of the central cells lie on or are parallel to a y-extending reference line in the x-y plane,
wherein at least some of the peripheral cells comprise an x-extending curved portion that passes through, and extends in an x-direction beyond, a y-extending wall plane of a central cell which lies directly adjacent in a y-direction.

2. The honeycomb body of claim 1 wherein the peripheral skin comprises a varying thickness about a circumference of the honeycomb body.

3. The honeycomb body of claim 1 wherein at least some of the peripheral cells further comprise a y-extending curved portion that passes through, and extends in a y-direction beyond, an x-extending wall plane of a central cell which lies directly adjacent in an x-direction.

4. The honeycomb body of claim 3 further comprising a transition web comprising transition web surfaces which form at least a portion of adjacent first and second peripheral cells, wherein the transition web forms a curved portion of a first peripheral cell ("first curved portion") and a curved portion of a second peripheral cell ("second curved portion").

5. The honeycomb body of claim 4 wherein the first curved portion comprises a shape with a continuously-varying radius.

6. The honeycomb body of claim 5 wherein the second portion comprises a shape with a continuously-varying radius.

7. The honeycomb body of claim 1 wherein the central cells comprise square cells.

8. The honeycomb body of claim 1 wherein the central cells comprise rectangular cells.

9. The honeycomb body of claim 1 wherein the central cells are selected from the group consisting of square cells and rectangular cells.

10. The honeycomb body of claim 1 wherein one or more of the peripheral cells is at least partially defined by an x-extending wall, a y-extending wall, and a y-extending curved portion or an x-extending curved portion.

11. The honeycomb body of claim 1 wherein the array of crisscrossing walls is disposed about a longitudinal axis extending in the axial direction, and the transition web intersects with the peripheral skin in a radial configuration with respect to the longitudinal axis.

12. The honeycomb body of claim 1 wherein the curved portion comprises a shape with a continuously-varying radius.

13. The honeycomb body of claim 1 wherein the curved portion comprises a shape with a continuously-varying radius extending from a first tangent with an x-extending wall to a second tangent with a y-extending wall.

14. A honeycomb body comprising a honeycomb structure and
a peripheral skin;
wherein the honeycomb structure comprises an interconnecting array of walls defining a plurality of central cells comprised of first parallel walls extending in an axial direction and configured in an x-direction in a transverse cross-sectional plane ("x-y plane") perpendicular to the axial direction ("x-extending walls") and intersecting at right angles with second walls extending in a y-direction in the x-y plane ("y-extending walls"), the honeycomb structure further comprising a plurality of peripheral cells disposed directly adjacent to the peripheral skin,
wherein the central cells are selected from the group consisting of square cells and rectangular cells,
wherein the peripheral skin forms at least part of at least some of the peripheral cells,
wherein intersections of the x-y plane and first wall surfaces of the x-extending walls of the central cells lie on or are parallel to an x-extending reference line in the x-y plane, and
wherein intersections of the x-y plane and second wall surfaces of the y-extending walls of the central cells lie on or are parallel to a y-extending reference line in the x-y plane,
wherein at least some of the peripheral cells comprise an x-extending curved portion that passes through, and extends in an x-direction beyond, a y-extending wall plane of a central cell which lies directly adjacent in a y-direction.

* * * * *